Sept. 1, 1959  C. V. TILDEN  2,902,259
PERCUSSION DRILL BIT AND METHOD OF PRODUCING IT
Filed Nov. 27, 1956  2 Sheets-Sheet 1

CARL V. TILDEN
INVENTOR.

BY
ATTORNEY

Sept. 1, 1959        C. V. TILDEN        2,902,259

PERCUSSION DRILL BIT AND METHOD OF PRODUCING IT

Filed Nov. 27, 1956        2 Sheets-Sheet 2

CARL V. TILDEN
INVENTOR.

BY
ATTORNEY

United States Patent Office 2,902,259
Patented Sept. 1, 1959

2,902,259

PERCUSSION DRILL BIT AND METHOD OF PRODUCING IT

Carl V. Tilden, Capistrano Beach, Calif.

Application November 27, 1956, Serial No. 624,537

8 Claims. (Cl. 255—63)

The present invention relates to percussive drill bits particularly adapted for the drilling of rock, concrete and the like and to a method by which they may be produced. More specifically, the invention comprises a drill bit in which abrasion-resistant cutting elements at the working face are provided to grind and reduce the material being worked upon by percussive action and in which the drill body is provided with a central bore and also with external longitudinal grooves to conduct the displaced material from the working face, the bore opening into at least one of the grooves at a point spaced from said working face.

In drilling holes in concrete, rock and other hard substances the drill bit is usually actuated with a rotary or a reciprocating motion or with a motion which is a combination of both. Bits particularly designed for use in rotary drilling are frequently provided with an external spiral groove which functions to feed ground material outwardly from the hole. Bits for reciprocating action are frequently exteriorly smooth, reliance being place upon vibration and air movement to accomplish the displacement. Neither of the two types functions with maximum effectiveness when used with the wrong type of motion and as a result frequently the ground material is not efficiently displaced but instead becomes packed around the cutting end of the bit where it places an unnecessary load upon the driving motor and interferes with the efficient operation of the bit.

The drill bit constructed in accordance with the present invention may be actuated by any one of the types of motions mentioned, but is particularly effective when actuated by reciprocating percussive action. The cutting elements at the end of the bit chip and abrade the substance being worked in and as the cuttings build up in the end of the hole they are displaced outwardly both interiorly and exteriorly of the drill body in a path which is short and direct.

Figure 1:
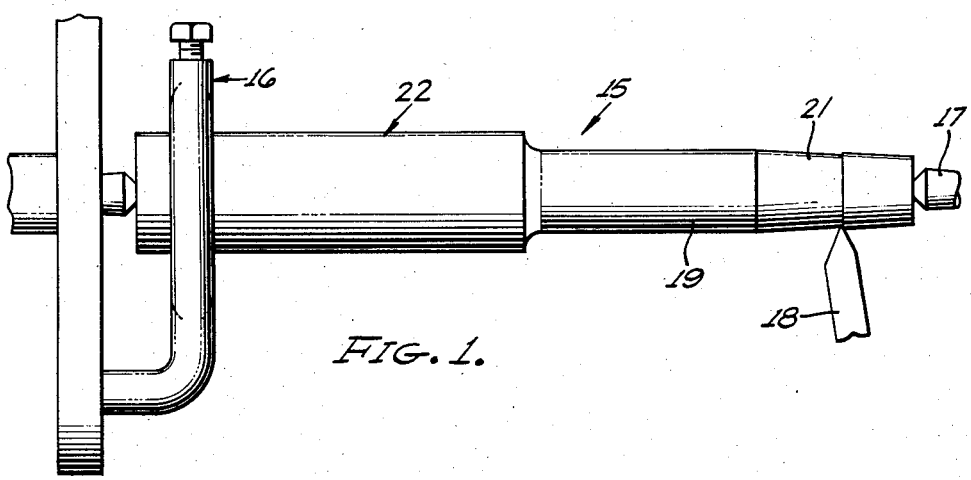
Figure 2:
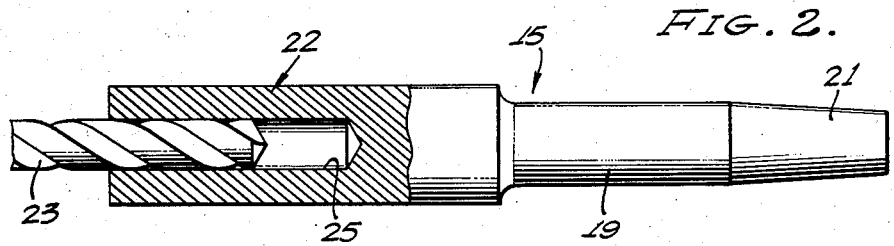
Figure 3:
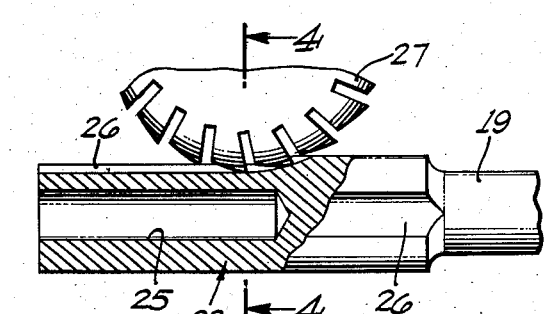
Figure 4:
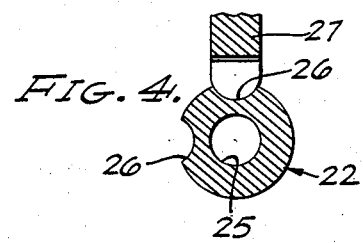
Figure 5:
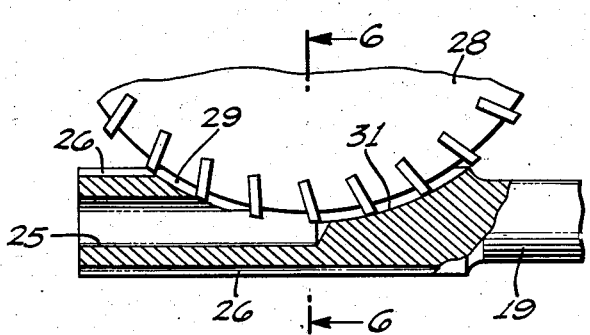
Figure 6:
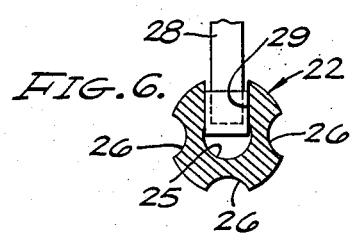
Figure 7:
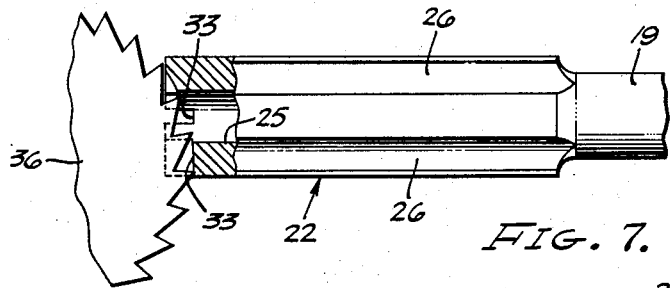
Figure 8:
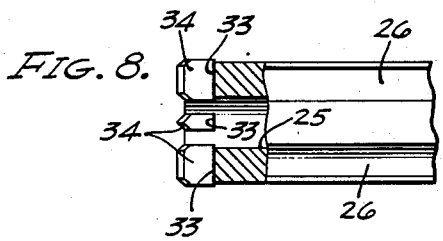
Figure 9:
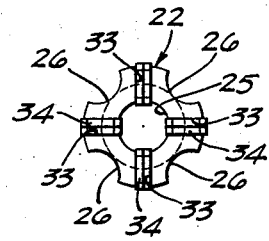
Figure 10:
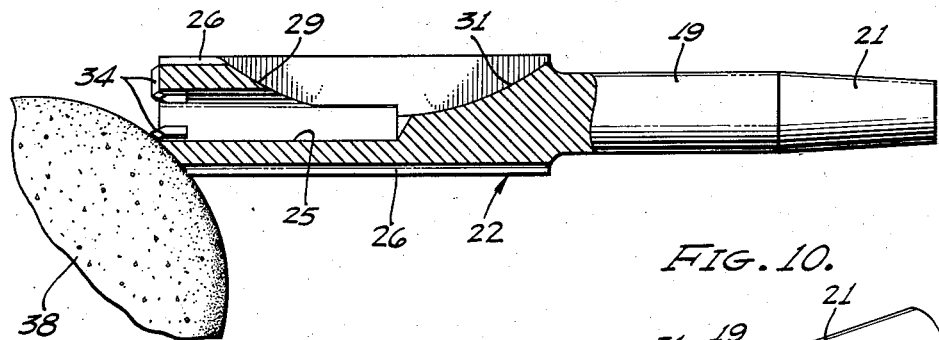
Figure 11:
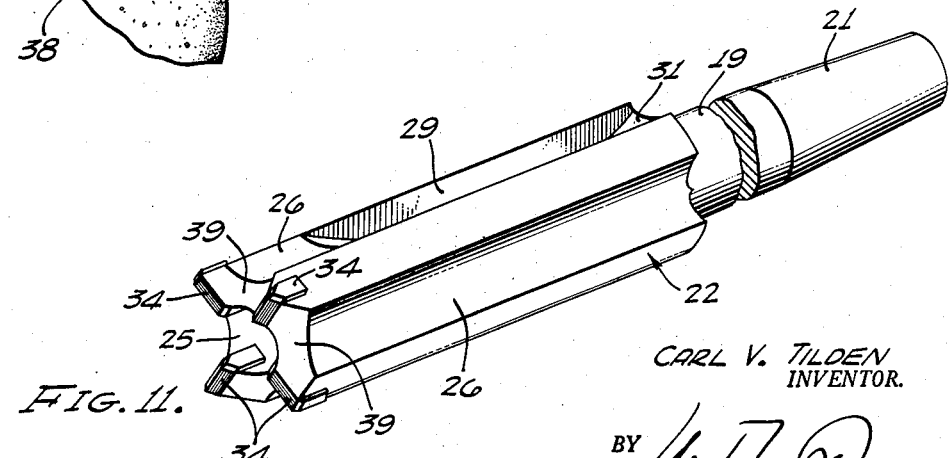

Referring now to the drawings in which the present invention is disclosed Figure 1 illustrates the first step in forming the drill bit body and shank from a solid rod of steel;

In Figure 2 the second step is illustrated in which the longitudinal bore is being drilled in the body of the drill bit;

In Figure 3 one of the longitudinal grooves through which the cuttings are guided is being formed by a milling cutter;

Figure 4 is a section upon the line 4—4 of Figure 3;

In Figure 5 one of the external longitudinal grooves is being opened to the central bore by a larger milling cutter;

Figure 6 is a transverse section upon the line 6—6 of Figure 5;

In Figure 7 transverse end slots in which the cutting elements are to be positioned are being formed in the end of the body by a milling cutter;

In Figure 8 the cutting elements are shown positioned in the end of the drill bit body in the slots formed in the step of Figure 7;

In Figure 9 is shown an end view of the tool of Figure 8, the cutting teeth being permanently positioned as by welding;

In Figure 10 is shown the step of removing the body between the cutters to form inclined approach channels leading outwardly into the longitudinal cutting grooves; and Figure 11 illustrates a drill bit constructed in accordance with the present invention and as made by the steps illustrated in Figures 1 to 10, inclusive.

Referring again to the drawings, the steps employed to produce a drill bit constructed in accordance with the present invention are illustrated. In Figure 1 a length of steel stock 15 is shown mounted for rotation in a work holder 16 with its opposite end supported by a center 17 as in a lathe. A cutting tool, indicated at 18, travels exteriorly along the body reducing one end to form a shank 19 with a tapered seat 21. The large diameter cylindrical body proper is indicated at 22. The second step is illustrated in Figure 2 and here the cylindrical body 22 is bored centrally with a drill 23 for a portion of its length to form an axial bore 25 which terminates short of the shank 19. Thereafter, and as illustrated in Figures 3 and 4, longitudinal grooves 26 are formed upon the exterior of the body 22 by means of a rotating milling cutter 27 having convexly curved cutting elements. Grooves 26, which are circumferentially spaced, extend the full length of body 22 and in the form illustrated are four in number. After cutting one groove 26 the milling cutter 27 is retracted to its initial position, the relative angular position of the blank and the cutter changed through ninety degrees, and the cutting operation repeated. Of course, if desired all of the grooves could be formed simultaneously by arcuately-spaced simultaneously-acting cutters.

Following the formation of the longitudinally extending grooves 26 a second large diameter milling cutter 28 is substituted for cutter 27. Cutter 27 preferably has cutting teeth with rounded ends to form arcuate grooves while cutter 28 has cutters which are preferably flat at their outer ends and of the same width as the cutting elements of the cutter 27. Milling cutter 28 is positioned relative to the blank 15 as illustrated in Figures 5 and 6 in position to cut through one of the grooves 26. Cutter 28 is fed into the blank until it has substantially intersected the plane of the longitudinal axis of the drill bit at which time, because of its larger diameter, a slot 29 will have been formed which intersects the inner end of the bore 25. Slot 29 has a gradually curved outwardly inclined bottom surface 31 which extends from the bore 25 to the end of the intersected groove 26 at the end of body 22.

Following the formation of the slot 29, transverse lateral slots 33 are milled in the end face of the drill bit spaced arcuately between the grooves 26 and adapted to receive the tungsten carbide cutting elements 34. A milling cutter 36 is used for this operation and in the preferred form the two slots 33 upon the opposite side of the axis of the body are diametrically opposed so that both can be formed in one pass of the cutter, following which the cutter would be turned through ninety degrees and a second pair of slots cut. The positioning of the cutting elements 34 in the slots 33 is conventional and they may be permanently retained as shown in Figures 8 and 9 in any conventional manner as by brazing or welding.

At this stage the end face of the drill body 22 between the cutting elements 34 is flat and it is desirable that inclined channels be provided to guide cuttings which do not enter the bore 25 into the groves 26. To provide these inclined guideways or channels the end of the drill bit is brought into contact with a rotary grinder 38 preferably having a rounded peripheral section and by abrasion the grinder forms inclined channels 39 as shown in Figure 10. The finished product is now present and is illustrated in Figure 11 where it is seen that the cutter elements 34, which as stated are preferably formed of tungsten carbide but may be formed of other suitable abrasion-resistant material, extend forwardly from the working end of the drill bit and slightly radially beyond the cylindrical body 22 and also slightly into the central bore 25. The sloping channels 39 extend outwardly from the bore 25 and intersect the longitudinally-extending exterior grooves 26 which extend the full length of the body 22, the one groove 26 being interiorly connected to the bore 25, as shown most clearly in Figures 10 and 11, by the slot or exhaust port 29.

In use with the bit mounted at its shank 19 in a device providing reciprocating action, the action would be as follows. In the reciprocation of the bit the cutter elements 34 chip away at the material being worked upon. Part of the cuttings enter the bore 25 while others are guided radially outwardly and rearwardly in the guideways 39 to enter the longitudinal groove 26. As additional material is chipped away it is forced longitudinally rearwardly through the bore 25 and through the grooves 26, the material in the bore 25 escaping from the interior of the bit through the port 29. The longitudinal grooves provide direct passages offering minimum resistance to the displacement of the material from the hole being drilled and their presence, while increasing the available space within the hole for the escape of the material, provides no surfaces which can effect a packing action during the reciprocation of the bit.

While the particular method and device herein shown and disclosed in detail are fully capable of attaining the objects and providing the advantages hereinbefore stated, it is to be understod that they are merely illustrative of the presently preferred embodiments of the invention and that no limitations are intended to the details of construction or design herein shown other than as defined in the appended claims.

I claim:

1. A percussion drill bit comprising a one-piece body formed exteriorly with longitudinally extending open-ended chip discharge grooves and interiorly with a central chip discharge bore several times longer than the diameter of the bore, a port extending the rearward extremity of said bore into one of said groves, arcuately spaced cutting elements positioned in one end of said body between said grooves and extending into said bore and exteriorly of said body, and a shank on said body by which said tool may be connected to an actuating unit.

2. A drill bit comprising a one-piece body formed with a shank, longitudinally extending open-ended chip discharge grooves reaching from the forward end of said body to the shank, a central chip discharge bore in said body several times longer than the bore diameter, and a port formed with a rearwardly and outwardly sloping bottom wall connecting said bore with one of said grooves.

3. The construction recited in claim 2 characterized in that the sloping bottom wall of said port extends from the rearward end of said bore to the end of said body.

4. A method of making a percussion drill from cylindrical drill stock comprising the steps of reducing one end thereof to form a shank with a taper, boring the opposite end thereof to provide a longitudinally extending bore ending short of the shank, forming longitudinally-extending circumferentially spaced grooves upon the exterior of said body, milling one of said groves to form a discharge port having a sloping curved bottom wall opening into said groove, milling the end of said rod spaced from the shank end to form transverse slots, and securing abrasion-resistant cutting elements in said slots.

5. A method of making a percussion drill from cylindrical drill stock comprising the steps of reducing one end thereof to form a shank with a taper, boring the opposite end thereof to provide a longitudinally extending bore ending short of the shank, forming longitudinally-extending circumferentially-spaced grooves upon the exterior of said body, milling one of said grooves to form a discharge port having a sloping curved bottom wall opening into said groove, milling the end of said rod spaced from the shank end to form transverse slots, securing abrasion-resistant cutting elements in said slots, and grinding the ends of said body between said cutting elements to form inclined sloping passages leading to said grooves.

6. A percussion drill bit comprising a one-piece body formed exteriorly with longitudinally extending open-ended chip conveying grooves and interiorly with a central chip conveying bore, a port extending the rearward extremity of said bore into one of said grooves, circumferentially spaced cutting elements positioned in one end of said body between said grooves and extending radially into said bore and radially beyond the exterior of said body, and a shank on said body by which said tool may be connected to an actuating unit characterized in that said bore and said grooves are connected by sloping outwardly-inclined wall surfaces at the forward end of said bore and in that said bore is connected to one of said grooves by a sloping outwardly-inclined surface at its rearward end.

7. That method of forming a percussive drill bit which comprises machining a shank on one end of a section of solid stock, drilling a bore axially of the opposite end, milling open-ended grooves longitudinally of said last mentioned end, milling an arcuate slot into one of said grooves to a depth forming a passage in communication with the inner end of said bore, and forming radial slots across the end of said drill bit in areas spaced between adjacent ones of said longitudinal grooves to seat therewithin wear-resisting cutting teeth.

8. That method defined in claim 7 characterized in the additional steps of rigidly mounting cutting teeth in said radial slots and thereafter finish grinding the exposed outer ends of said teeth to provide radial cutting rearwardly flaring edges, and simultaneously cutting relief channels in the end of the drill body between said teeth.

References Cited in the file of this patent

UNITED STATES PATENTS

| | | |
|---|---|---|
| 1,296,078 | Hawkesworth | Mar. 4, 1919 |
| 1,602,498 | McCanna | Oct. 12, 1926 |
| 2,297,983 | Rea | Oct. 6, 1942 |
| 2,412,939 | Aston | Dec. 24, 1946 |
| 2,463,953 | Curtis | Mar. 8, 1949 |
| 2,506,474 | Tilden | May 2, 1950 |
| 2,659,577 | Watson | Nov. 17, 1953 |
| 2,661,930 | Spang | Dec. 8, 1953 |
| 2,807,443 | Wyman | Sept. 24, 1957 |

FOREIGN PATENTS

| | | |
|---|---|---|
| 897,537 | Germany | Oct. 15, 1953 |

UNITED STATES PATENT OFFICE

CERTIFICATE OF CORRECTION

Patent No. 2,902,259                                             September 1, 1959

Carl V. Tilden

It is hereby certified that error appears in the printed specification of the above numbered patent requiring correction and that the said Letters Patent should read as corrected below.

Column 4, lines 50 and 51, strike out "rearwardly flaring" and insert the same after "cutting" and before "relief" in line 51, same column.

Signed and sealed this 8th day of March 1960.

(SEAL)
Attest:

KARL H. AXLINE
Attesting Officer

ROBERT C. WATSON
Commissioner of Patents